United States Patent Office.

CHARLES LAUGA, OF NEW ORLEANS, LOUISIANA, ASSIGNOR TO HIMSELF AND ALEXANDER CHARLES LANDRY, OF SAME PLACE.

MANUFACTURE OF DEXTRINE, GLUCOSE, AND GRAPE-SUGAR.

SPECIFICATION forming part of Letters Patent No. 267,546, dated November 14, 1882.

Application filed July 7, 1882. (No specimens.)

*To all whom it may concern:*

Be it known that I, CHARLES LAUGA, of New Orleans, in the parish of Orleans and State of Louisiana, have invented a new and useful Improvement in the Manufacture of Dextrine, Glucose, and Grape-Sugar; and I do hereby declare that the following is a full, clear, and exact description of the same.

My invention relates to a new process for transforming all cereals and amylaceous substances, but preferably Indian corn, into dextrin, glucose, and grape-sugar. The process is substantially as follows, viz: The grain, previously ground to a coarse grist, is first treated with an attacking solution, which I designate as "A." To every one hundred pounds of grain used are added from eighteen to twenty-three gallons of this solution A, which is composed as follows, viz: I take glucose-juices of 2° Baumé density, oxidized either by being aerated or by means of ozone, &c., but carefully guarding against the use in this operation of the usual and known oxidizing agents—such as chromic and permanganic acids, &c.—so as to keep the glucose free from the peculiar and *sui generis* flavor of these several oxidizers, which flavor it is almost impossible to eliminate, and by dispensing with these acids also avoiding the introduction of toxic matters into the sirups. To the above solution is added one and one half pound of highly concentrated and purified phosphoric acid, which completes the attacking solution A, the merit of which is that it does not turn the sirup dark, nor give it a bad taste. The grain mixed with the solution A is introduced in a closed vessel of any material, cypress wood being preferred, as it is perfectly neutral and gives neither flavor nor taste to its contents. The mixture is then rapidly brought to the boiling-point, the transformation being accomplished in a very short time. Conversion into dextrine is indicated first by the reaction of iodine dissolved in alcohol, and for glucose proper by the counter-proof with alcohol at 180°, operating as follows, viz: A small quantity of the filtered and cooled mash is introduced in a test-tube containing alcohol at 180°, (United States standard,) where it must remain clear, giving no precipitate. Dextrine, being insoluble in alcohol, will precipitate in white flaky masses, and as long as these appear the transformation is not complete, and must be continued. When the desired point is reached the mash is removed to a completely-closed vessel, and there cooled by the usual process of cold water passing through coiled pipes in the tub. The object aimed at in cooling in a closed vessel is the prevention of all atmospheric action and contact upon the hot mash, which action has a tendency to partially transform glucose into glucosic acid at this stage of the process, thus reducing the yield, and, besides, introducing in the mass an agent difficult and expensive to eliminate. After being cooled down to 125° Fahrenheit the mash is dropped into a neutralizing-tub, where it is saturated either with saccharate of lime, or saccharate of hydrocarbonate of lime, or saccharate of magnesia, or saccharate of hydrocarbonate of magnesia, the above-named products being preferred on account of both the increased quantity and superior quality of the finished products resulting from their use, and for the reason, also, that these reagents are not so liable to be contaminated with impurities. As soon as neutralized the mash is, by means of a force-pump, driven through filter-presses containing a mixture of bone-black or animal charcoal and charred blood, with a small quantity of calcined magnesia. The filter, being externally lined with the usual stout cloths used in filter-pressing, retains in the press-chambers the solid residuum of the mash, which is good for and may be utilized either as fertilizer or cattle food without any further treatment, while the liquid percolates through the above-described compound, which in one operation filters it mechanically, decolorizes and deodorizes it, and renders the resulting liquid perfectly neutral.

For filtering and decolorizing the sirup, I may use a press of any desired or approved construction.

The juice expressed by the foregoing operation, weighing from 10° to 12° Baumé, is then concentrated in vacuo at a temperature not exceeding 160° Fahrenheit, and with no less than twenty inches vacuum. At a concentration of 23° Baumé the sirup is again passed through the above-described filter-press containing bone-black or animal charcoal, charred blood, and a small quantity of calcined magnesia, so as to eliminate the few remaining particles of albuminoids and gums that may have escaped the previous treatment. Osmose apparatuses may here be used, but their advantage is not clearly demonstrated. After their second passage through the filter-press the sirups are passed through ordinary bone-black filters under pressure, and thence into the vacuum-pan for final evaporation and concentration, at a temperature not exceeding 130° Fahrenheit, to the several known densities requisite for either glucose, grape-sugar, or dextrine, it being well known that each one of the above-named products requires a different degree of concentration.

In further explanation of what is meant by "weak oxygenated glucose liquor," as referred to by me as one of the agents used in the attacking solution, I would state that I use the weak glucose liquor or low-proof glucosic water resulting from the last washing of the filter-presses with warm water. This last washing furnishes a liquid composed of water, impure glucose mixed with very minute particles of gluten, and by this fact with nitrogenous or azotized proteic substances. The degree, 2° Baumé, gives the specific weight of this impure mixture. This impure glucosic mixture is placed in a closed vessel and therein submitted to pressure in contact with an oxidizing gas. Oxygen produced by any industrial process transforms this liquid into weak nascent, saccharic, ulmic, formic acids, &c., possessed of very energetic powers of transformation. Whenever a mixture of inverted sugar, whether of molasses from sugar-cane, glucose from grain, or grape-sugar from fruits, and of azotized proteic matters, whether albuminous, vegetable, or animal, is put in presence of oxygen or of an oxidizing gas the azotized nitrogenous matter borrowing oxygen for itself is transformed into nitrous gas, which reacts with great energy upon the saccharine matter and transforms it into saccharic, formic, ulmic acids, &c., which represent the mixture of acids derived from saccharic, azotized, nitrogenous matter in the presence of oxygen or other oxidizing matter or substance.

Glucose of any origin cannot, when placed in the presence of oxygen alone, produce an acid capable of transforming and saccharifying amylaceous matters. It is absolutely necessary that the above-mentioned combination or mixture should take place in the presence of and in conjunction with nitrogenous azotized matters. In my particular case this nitrogenous matter is furnished by the proteic matter contained in the gluten of grain. By the oxidation of the azotized nitrogenated glucose I produce, first, a very diluted nitrous acid; second, the reaction of this last acid, formed and nascent, which, pressed by constant oxidation, seizes upon the saccharine matter and transforms it into saccharic, formic, ulmic, and other similar acids generated by the action of the energetic acids on the saccharine substances.

My process recommends itself, first, by the cheapness of production of the new acids; second, their perfect immunity; third, the ease with which an always-regular product can be obtained, free from mineral matters. The degree, 2° Baumé, can either be reduced or increased in the attack of this impure mixture by oxygen. The operator will himself decide upon and regulate the specific gravity of the impure mixture.

Having thus described my invention, what I claim as new is—

1. The process of manufacturing glucose and grape-sugar, which consists in attacking the cereal or starchy matter with a weak oxygenated glucose liquor mixed with phosphoric acid, then neutralizing the product with one of the saccharates of the alkaline earths, and then filtering, decolorizing, and concentrating the same, substantially as described.

2. The method of converting the starchy substance into glucose, which consists in treating the same with a weak oxygenated glucose-liquor with an admixture of phosphoric acid, as and for the purpose described.

3. The method herein described of neutralizing the acids used in converting starch into glucose, consisting in treating the crude glucose with the saccharate of magnesia, as set forth.

4. The method of filtering, decolorizing, deodorizing, and completing the neutralization of the glucose juices in one operation, which consists in passing it under pressure through a composition or layers of animal charcoal, charred blood, and a small quantity of calcined magnesia, as described.

5. The method of preventing the formation of glucosic acid when the mash is removed from the converters, which consists in cooling the mash in a closed vessel, as and for the purpose set forth.

CH. LAUGA.

Witnesses:
 EDWD. W. BYRN,
 SOLON C. KEMON.